Nov. 2, 1948.　　　M. A. JOPPICH ET AL　　　2,452,933
BEVERAGE MIXING AND DISPENSING DEVICE
Filed Sept. 20, 1946　　　　　　　　　　4 Sheets-Sheet 1

INVENTORS
MAX A JOPPICH &
DR WALLACE JOURE
BY
Robert A. Sloman
ATTORNEY

Nov. 2, 1948.    M. A. JOPPICH ET AL    2,452,933
BEVERAGE MIXING AND DISPENSING DEVICE
Filed Sept. 20, 1946    4 Sheets-Sheet 3

INVENTORS
Max A. Joppich &
Dr. Wallace Joube
BY
Robert A. Sloman
ATTORNEY

Nov. 2, 1948.  M. A. JOPPICH ET AL  2,452,933
BEVERAGE MIXING AND DISPENSING DEVICE
Filed Sept. 20, 1946  4 Sheets-Sheet 4

INVENTORS
MAX A. JOPPICH &
BY DR. WALLACE JOURE

Robert A. Sloman
ATTORNEY:

Patented Nov. 2, 1948

2,452,933

UNITED STATES PATENT OFFICE 2,452,933

BEVERAGE MIXING AND DISPENSING DEVICE

Max A. Joppich and Wallace Joure, Detroit, Mich.

Application September 20, 1946, Serial No. 698,206

15 Claims. (Cl. 225—26)

This invention relates to a coffee making and dispensing device, and more particularly to a device where the coffee is not stored, but on the other hand is made cup by cup at the moment it is to be dispensed. Naturally this contemplates the use of a fine granular coffee which dissolves and instantly mixes when substantially boiling water is introduced.

It is the object of the present invention to provide a coffee making device wherein the coffee is made immediately prior to its being dispensed.

It is the object of this invention to provide in such a device a coffee measuring means which is manually rotatable to deliver a predetermined quality of dry coffee into a mixing chamber.

It is the further object of this invention to provide a valve construction governing inlet of coffee, and a successive inlet of water into said mixing chamber, as well as a successive discharge of the mixed coffee in response to manual control.

It is the further object of this invention to provide further valve means which is manually controlled in timed relation to regulate the delivery of hot water to the mixing chamber.

It is the further object of this invention to provide a manually operative hand control which is adapted throughout a 360° rotation to successively govern the delivery of coffee to the mixing chamber, the introducing of water to said chamber, and the delivery of the mixed coffee to a dispensing means.

It is the still further object of this invention to provide a rotatable coffee mixing means together with jet means for supplying hot water at increased pressure and velocity to impinge upon said mixing means effecting rotation thereof.

It is the further object of this invention to provide a means for the mixing of various substances in measured quantities with water other than the making of coffee.

These and other objects will be seen from the following specification and claims in conjunction with the appended drawings in which:

It will be understood that the above drawings illustrate merely a preferable embodiment of the invention, and that other embodiments are contemplated within the scope of the claims hereafter set out.

The coffee maker and dispenser consists of the hollow upright substantially rectangular container 11 having a supporting base 12, and removable cover 13.

Figure 3:
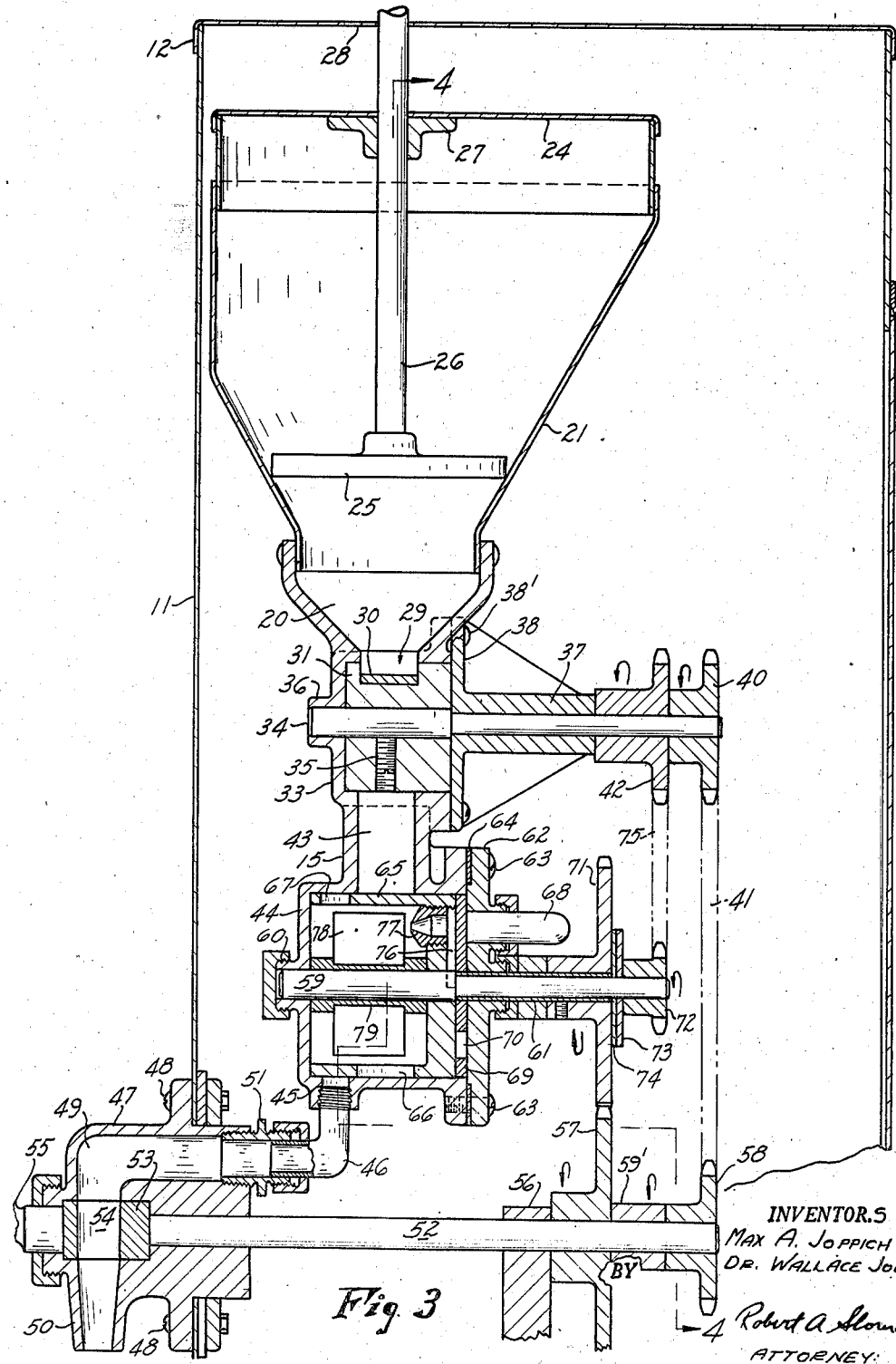
Fig. 3 is a side elevational section of said device illustrating its operative mechanism.
Figure 4:
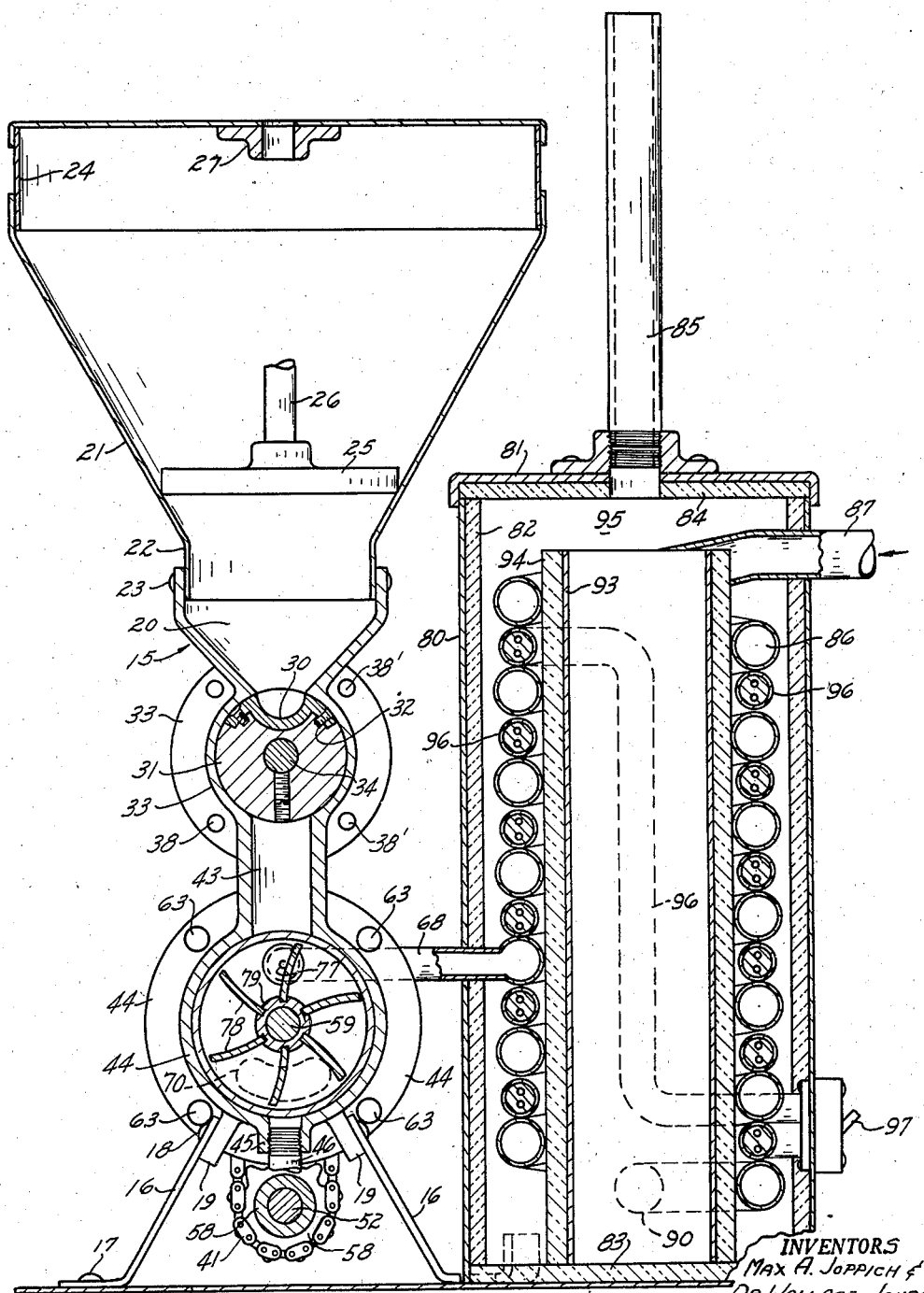
Fig. 4 is a rear elevation section thereof on line 4—4 of Fig. 3.

Platform 14, Figs. 3 and 4, is positioned within container 11 providing a support for the valve housing casting 15. Angular converging legs 16 secured at 17 to said platform have their upper ends joined and secured at 18 to the angular depending legs 19 which form a part of casting 15.

The open circular upper end of casting 15 terminates in the converging coffee delivery portion 20. Converging coffee bin 21 has a cylindrical throat 22 at its lower end which projects into member 20 and is suitably secured thereto as by rivet 23. The upper end of bin 21 terminates in a cylindrical upright portion within which bin cover 24 is removably inserted.

Coffee measuring disc 25 is centrally carried at the end of indicating shaft 26 which is slidably positioned through bushing 27 on cover 24, and which is adapted to visibly project up through opening 28 in container cover 12. Disc 25 rests upon the top of the coffee stored in bin 21 and is adapted to gravitate towards the bottom of bin 21 as the coffee is used, with its upper visible end indicating the extent of the coffee supply.

The hollow converging portion 20 of casting 15 terminates in a dry coffee discharge opening 29 which is adapted for registry with the measuring receptacle 30 carried on the outer surface of rotatable drum 31. Said receptacle is removably secured within a corresponding opening formed in drum 31 by means of screws 32. It is contemplated that said receptacle may be replaced by similar receptacles of varying capacity depending upon the quantity of coffee or other substance sought to be measured.

Drum 31 is rotatably mounted within cylindrical portion 33 of casting 15, and upon the central operating shaft 34. Said drum is secured to shaft 34 by set screw 35, while said shaft is rotatably journaled at one end within the hollow hub 36 forming a part of casting 15, and journaled at its other end within the cylindrical portion 37 forming part of cover 38. The latter is removably secured to drum housing 33 by screws 38'.

Sprocket gear 40 mounted on the end of shaft 34 is adapted to effect rotation thereof in view of the sprocket chain 41 joined thereto and whose movement will be hereafter described. A secondary sprocket gear 42 is also carried on shaft 34 for rotatably operating the cup valve hereafter described.

Drum housing 33 has a discharge opening at its bottom which terminated in the hollow dry coffee chute 43 formed within casting 15. The lower end of chute 43 is adapted to discharge into coffee mixing chamber housing 44 also forming a part of casting 15. Said housing has a coffee outlet 45 in its bottom into which is threaded nipple 46.

Spigot housing 47 mounted on the front wall of container 11 and secured thereon by bolts 48 projects partially into the interior thereof. Its fluid passage 49 terminates in the downwardly projecting spout 50 while its inlet is joined to the nipple 46 by means of the interconnecting fitting 51.

Manually rotatable shaft 52 projects through housing 47 and carries a cylindrical valve member 53 which has a transverse opening 54 therein adapted for registry with the fluid channel in said housing. Member 54 essentially does not function as a valve, but merely provides a means of connecting between manually rotatable handle 55 and shaft 52, and at the same time permits fluid to flow through passage 49. The discharge of fluid through spout 50 is governed by the proper positioning of the cup valve in mixing chamber 44, hereafter described in detail.

It is seen from Fig. 3 that rotatable shaft 52 is journaled near its outer end through the bearing support 56 which extends upwardly from platform 14. Spur gear 57 and sprocket gear 58 are carried on the outer end of shaft 52 for rotation therewith, there being a suitable spacer 59' interposed between said gears. It will be noted that sprocket gears 58 and 40 are interconnected by sprocket chain 41 for movement in unison.

Rotary shaft 59 extends centrally through mixing chamber 44, is journaled at one end within hub 60, and at points intermediate its ends within rotatable disc valve operating sleeve 61. Said sleeve is rotatable upon and in respect to shaft 59, and is also journaled within a central opening within removable cover plate 62. The latter is retained on the end of housing 44 by screws 63, with a suitable gasket 64 being interposed between said plate and housing.

Hollow cylindrical cup valve 65 is rotatably journaled within mixing chamber housing 44, with its base portion centrally mounted on and secured to rotatable shaft 59.

Figure 5:
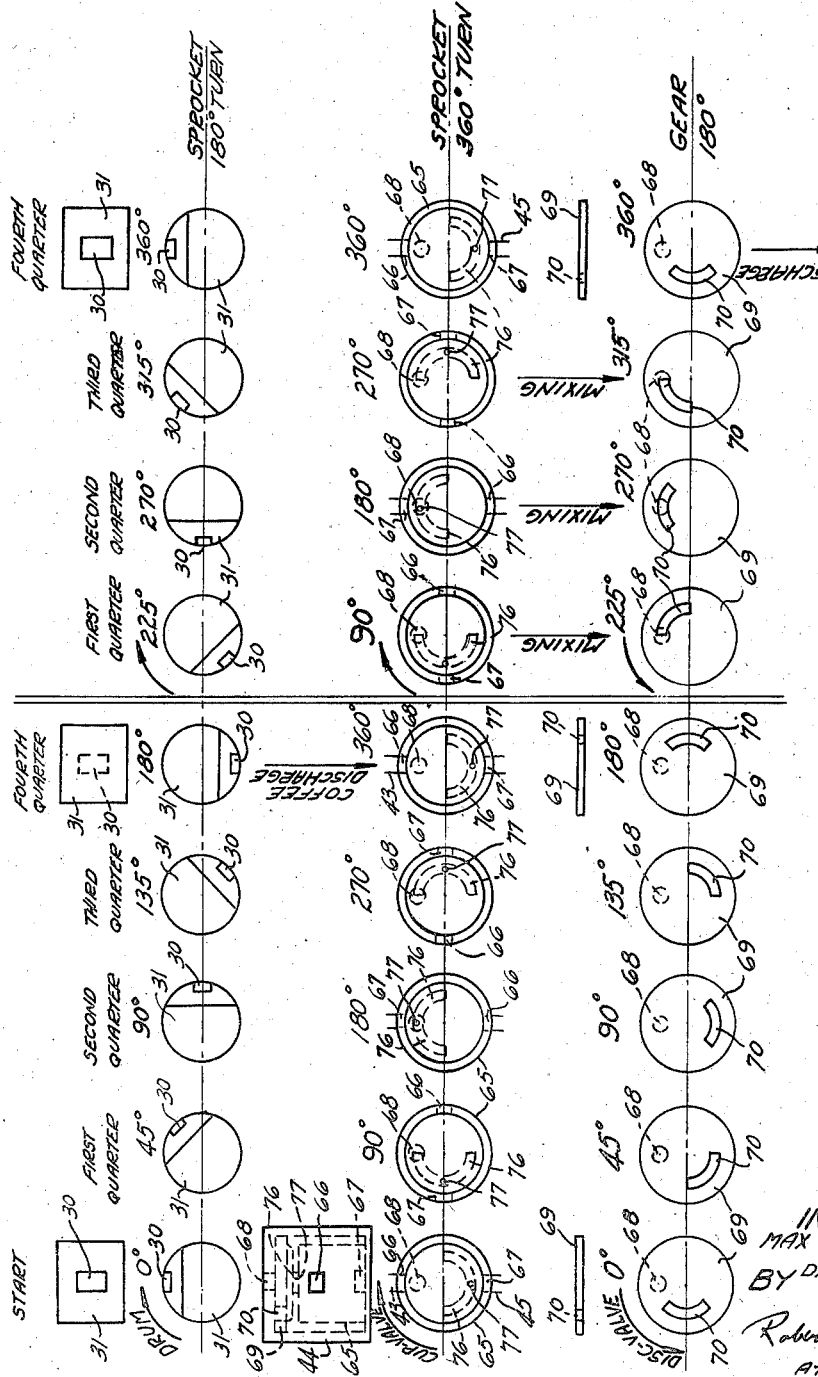
Fig. 5 is a diagrammatic view illustrating the coffee measuring drum, the mixing chamber controlling cup valve, and the hot water controlling disc valve, and further illustrating the timed relation of said elements throughout a 360° rotation of the hand control to which each of said members are joined in relative timed relation.

Inlet opening 66 is formed in the side wall of cup valve 65 and is best illustrated in the diagram of Fig. 5. Said opening when in its upper vertical position is adapted for registry with the discharge opening of chute 43, permitting dry powdered or granular coffee to drop into the mixing chamber.

The cup valve also has a discharge opening 67 formed in its side wall which is adapted for registry with the opening in coffee outlet 45. Hot or boiling water inlet pipe 68 is joined to a suitable hot water source hereafter described for supplying water to the coffee mixing chamber within cup valve 44.

Rotatable disc valve 69 best illustrated in Fig. 5 has a 90 degree arcuate transverse slot 70 therein adapted for registry with hot water pipe 68. Said valve 69 is rotatably positioned within housing 44 with its flat inner surface in registry with the flat end wall of cup valve 65. Disc valve 69 is centrally mounted and secured upon the inner end of rotatable sleeve 61 which is rotatably journaled within cover 62 and upon rotatable shaft 59.

Spur gear 71 is secured and carried on the end of sleeve 61 and is at all times in mesh with corresponding manually rotated spur gear 57. Shaft 59 projects through sleeve 61 and extends beyond the end thereof carrying on its end sprocket gear 72, there being a washer 73 and gasket 74 mounted on said shaft and interposed between gears 72 and 71.

Sprocket gears 72 and 42 are interconnected by sprocket chain 75 and, as the former gear is half the size of the latter, is adapted to rotate twice as fast thereof for the purpose hereafter described.

Referring to Figs. 3 and 5 the central base portion of said cup valve has formed in its outer surface a 180 degree arcuate slot 76; and a water inlet jet 77 is threaded through said valve adjacent the central portion of said slot. Jet member 77 projects into the beverage mixing chamber within cup valve 64 and is adapted to direct hot or boiling water at relatively high velocity into direct impingement with the angular vanes 78.

Vanes 78 are centrally secured to hollow member 79 which is loosely and rotatably mounted upon shaft 59 within said cup valve.

Vanes 78 will thus rotate rapidly when impinged upon by water at relatively high velocity delivered through jet 77, so that the coffee or other substance previously dropped into the mixing chamber will be thoroughly mixed and dissolved in the hot water.

Figure 1:
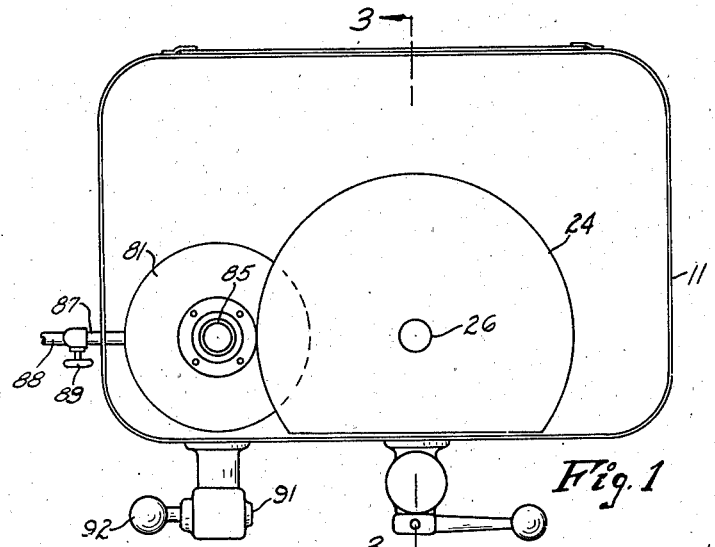
Fig. 1 is a plan view of the coffee making and dispensing device with its cover removed.

The hot water heating unit consists of a hollow, cylindrical shell 80 which is positioned within the main container 11 and has a cover 81 Figs. 1 and 4. Hollow cylindrical insulating member 82 preferably constructed of asbestos is positioned within shell 80 adjacent its inner wall. Further there is a base insulating member 83 as well as a top insulating member 84 which is positioned within cover 81.

Hollow vapor exhaust pipe 85 threadably secured to cover 81, and in communication with the interior of shell 80, extends upwardly projecting through a corresponding opening in container cover 13. Spiral water coil 86 having an inlet 87 is longitudinally positioned and supported within shell 80 with its outlet pipe 68 arranged to deliver hot or boiling water to the beverage mixing chamber within cup valve 65, above described.

Figure 2:
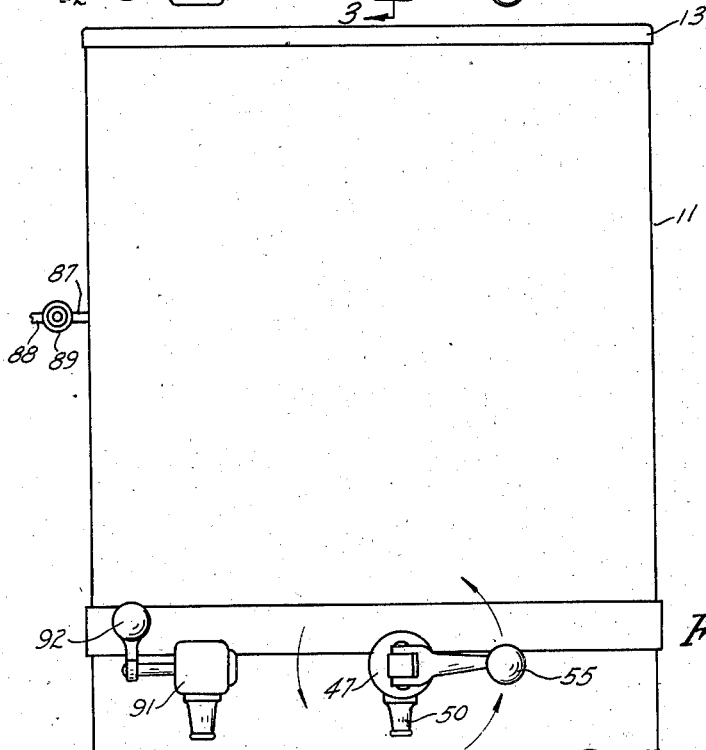
Fig. 2 is a partially broken away elevational view thereof with its cover in position.

Water supply pipe 88 on the outside of container 11, Figs. 1 and 2 is joined to coil inlet 87 with hand valve 89 interposed. Coil 86 has a secondary hot water outlet 90 at its lower end adapted to supply hot water to spigot 91, Figs. 1 and 2 with hand control 92.

Hollow cylindrical member 93 carrying cylindrical insulating member 94 is longitudinally projected through the center of hot water coil 86 thereby providing an annular fully insulated chamber 95 therefor. A suitable electric heating coil 96 is positioned with chamber 95 with its elements arranged between the turns of hot water coil 86 throughout its length. The ends of heating coil 96 terminate in the hand switch 97 which is suitably joined to a source of electrical energy. This heating coil 96 associated with water coil 86 within insulated chamber 96 is adapted to provide adequate hot or boiling water which is directed to the beverage mixing chamber through outlet pipe 68.

Referring now to Figs. 3 and 5 it will be seen that one cup of coffee or other beverage will be delivered at spout 50 on one complete 360 degree turn of spigot handle 55. As illustrated in the diagram, Fig. 5, the drum 31 with measuring cup 30 rotates 360 degrees on a complete 360 degree turn of said handle. During the same period cup valve 65 makes two complete 360 degree turns; and at the same time disc valve 69 makes one complete 360 degree turn.

In the initial position of drum 31 shown in the diagram as zero degrees, measuring receptacle 30 will be full of dry coffee or any other substance to be measured as for instance, cocoa or postum. At the end of 180 degree turn of handle 55 drum 31 will have also turned 180 degrees so that its receptacle 30 is down to deliver the coffee into chute 43.

Cup valve inlet 66 has already made a 360 degree turn and is now aligned with chute 43 to permit the dry coffee to drop into the mixing chamber within cup valve 65. So far no water is introduced into said chamber inasmuch as disc valve 69 is interposed between water outlet 68 and the arcuate water passage 76 in cup valve 65 which communicates with jet 77. To deliver hot water to the mixing chamber it is necessary for the slot 70 of disc valve 69 to register with water inlet 68 at the same time as a part of slot 76 in valve 65 registers with some portion of disc valve slot 70.

In the diagram disc valve 69, which rotates in the opposite direction to that of the drum and the cup valve is not in a position to open water inlet 68 until it has reached the 225 degree position, where it positively overlaps inlet 68. Water can now pass through disc valve 69 and will start to bleed water into the cup valve slot 76 only after an additional slight turn.

In the 270 degree position of disc valve 69 the maximum water is flowing through valve opening 70 as well as the opening 76 in cup valve 65 which is in communication with jet 77. In fact water will be supplied in all positions of the disc valve 69 between 225 and 315 degrees. These positions correspond to the positions of cup valve 65 between 90 and 270 degrees of its second complete rotation as illustrated in Fig. 5.

It will be seen that the mixed coffee in cup valve 65 is retained therein until the spigot handle 55 completes its 360 degree rotation. In the last part of the rotation of said handle, i. e. through the 315 to 360 degree positions, it is seen that this valve port 70 is now moved out of communicatiton with water inlet pipe 68, cutting off all water to the mixing chamber. In fact between the 315 and 360 degree positions of said disc valve, no water flows.

At the same time as disc valve 69 completes its 360 degree rotation it is seen that cup valve 65 has also completed its second 360 degree rotation, so that its inlet opening 67 registers with coffee delivery pipe 46, and the mixed coffee will now be dispensed, through outlet 45, through spigot 47 and its spout 50.

Inlet opening 66 is adapted for registry with chute 43. In the 270 degree position of disc valve 69 permitting the entry of water into the mixing chamber, it is seen that cup valve opening 66 though in its lowest position will not register with beverage outlet 45, and the mixed beverage is effectively retained within the cup valve. Likewise the cup valve outlet opening 67 as shown in Fig. 3 will not be in registry with chute 43, and therefore no water can enter the same.

By the time handle 55 has completed its 360 degree turn, the drum has also completed a 360 degree turn, and its measuring receptacle 30 is now upwardly positioned to be refilled from bin 20—21.

Having described our invention, reference should now be had to the claims which follow for determining the scope thereof.

We claim:

1. A beverage mixing and dispensing device comprising a storage bin, a housing having a mixing chamber adapted for communication therewith and having fluid inlet and discharge openings therein, a substance measuring device interposed between said bin and said housing, and valve means in said housing having a plurality of openings therein adapted for successive independent registry with said measuring device, said fluid inlet and said fluid discharge openings.

2. A beverage mixing and dispensing device comprising a storage bin, a housing having a mixing chamber adapted for communication therewith and having fluid inlet and discharge openings therein, a rotatable substance measuring device interposed between said bin and said housing, and valve means in said housing having a plurality of openings therein adapted for successive independent registry with said measuring device, said fluid inlet and said fluid discharge openings.

3. A beverage mixing and dispensing device comprising a storage bin, a housing having a mixing chamber adapted for communication therewith and having fluid inlet and discharge openings therein, a substance measuring device interposed between said bin and said housing, rotatable valve means in said housing having a plurality of openings therein adapted for successive independent registry with said measuring device, said fluid inlet and said fluid discharge openings, and secondary valve means in said housing associated with said first valve means for controlling fluid communication between said inlet opening and said first valve means.

4. A beverage mixing and dispensing device comprising a storage bin, a housing having a mixing chamber adapted for communication therewith and having fluid inlet and discharge openings therein, a substance measuring device interposed between said bin and said housing, rotatable value means in said housing having a plurality of openings therein adapted for successive independent registry with said measuring device, said fluid inlet and said fluid discharge openings, and secondary rotatable valve means in said housing associated with said first valve means for controlling fluid communication between said inlet opening and said first valve means.

5. A beverage mixing and dispensing device comprising a storage bin, a housing having a mixing chamber adapted for communication therewith and having fluid inlet and discharge openings therein, a substance measuring device interposed between said bin and said housing, rotatable valve means in said housing having a plurality of openings therein adapted for successive independent registry with said measuring device, said fluid inlet and said fluid discharge openings, a fluid source associated with said housing with a discharge pipe joined to said fluid inlet opening, and secondary valve means in said housing associated with said first valve means for controlling fluid communication between said inlet opening and said first valve means.

6. A beverage mixing and dispensing device comprising a storage bin, a housing having a mixing chamber adapted for communication therewith and having fluid inlet and discharge openings therein, a substance measuring device interposed between said bin and said housing, rotatable valve means in said housing having a plurality of openings therein adapted for successive independent registry with said measuring device, said fluid inlet and said fluid discharge openings, a fluid source associated with said housing with a discharge pipe joined to said fluid inlet opening, secondary valve means in said housing associated with said first valve means for controlling fluid communication between said inlet opening and said first valve means, and heating means associated with said fluid source.

7. A beverage mixing and dispensing device comprising a storage bin, a housing having a mixing chamber adapted for communication therewith and having fluid inlet and discharge openings therein, a substance measuring device interposed between said bin and said housing, valve means in said housing having a plurality of openings therein adapted for successive independent registry with said measuring device, said fluid inlet and said fluid discharge openings, and mixing means rotatably journaled within said housing.

8. A beverage mixing and dispensing device comprising a storage bin, a housing having a mixing chamber adapted for communication therewith and having fluid inlet and discharge openings therein, a substance measuring device interposed between said bin and said housing, valve means in said housing having a plurality of openings therein adapted for successive independent registry with said measuring device, said fluid inlet and said fluid discharge openings, mixing means rotatably journaled within said housing, and a jet within one of the openings in said valve means for delivering fluid at relatively high velocity to impinge upon said mixing means to rotate the same.

9. A beverage mixing and dispensing device comprising a storage bin, a housing having a mixing chamber adapted for communication therewith and having fluid inlet and discharge openings therein, a substance measuring device interposed between said bin and said housing, a rotatable valve in said housing having a substance inlet port, a fluid inlet port, and a discharge port, adapted respectively for successive registry with said measuring device, said fluid inlet opening and said fluid discharge opening, and a second rotatable valve means in said housing associated with said fluid inlet port and having a passage there-through for controlling fluid communication between said inlet opening and said fluid inlet port.

10. A beverage mixing and dispensing device comprising a storage bin, a housing having a mixing chamber adapted for communication therewith and having fluid inlet and discharge openings therein, a rotatable substance measuring device interposed between said bin and said housing, a rotatable valve in said housing having a substance inlet port, a fluid inlet port, and a discharge port, adapted respectively for successive registry with said measuring device, said fluid inlet opening and said fluid discharge opening, a second rotatable valve means in said housing associated with said fluid inlet port and having a passage therethrough for controlling fluid communication between said inlet opening and said fluid inlet port, and rotatable means operatively joined to said measuring device, said first valve and said second valve in timed relation for succesively introducing a measured substance into said mixing chamber, introducing fluid thereto, and dispensing of the fluid mixture therefrom.

11. A beverage mixing and dispensing device comprising a storage bin, a housing having a mixing chamber adapted for communication therewith and having fluid inlet and discharge openings therein, a rotatable substance measuring device interposed between said bin and said housing, rotatable valve means in said housing having a plurality of openings therein adapted for successive independent registry with said measuring device, said fluid inlet and said fluid discharge openings, secondary valve means in said housing associated with said first valve means for controlling fluid communication between said inlet opening and said first valve means, and rotatable means operatively joined to said measuring device, said first valve means and said second valve means in timed relation for successively introducing a measured substance into said mixing chamber, introducing fluid thereto, and dispensing of the fluid mixture therefrom.

12. A beverage mixing and dispensing device comprising a storage bin, a housing having a mixing chamber adapted for communication therewith and having fluid inlet and discharge openings therein, a rotatable substance measuring device interposed between said bin and said housing, a rotatable valve in said housing having a substance inlet port, a fluid inlet port, and a discharge port, adapted respectively for successive registry with said measuring device, said fluid inlet opening and said fluid discharge opening, a second rotatable valve means in said housing associated with said fluid inlet port and having a passage therethrough for controlling fluid communication between said inlet opening and said fluid inlet port, beverage dispensing means joined to said fluid discharge opening, and rotatable means extending through said dispensing means operatively joined to said measuring device, said first valve and said second valve in timed relation for successively introducing a measured substance into said mixing chamber, introducing fluid thereto, and dispensing of the fluid mixture therefrom.

13. A beverage mixing and dispensing device comprising a storage bin, a housing having a mixing chamber adapted for communication therewith and having fluid inlet and discharge openings therein, a rotatable substance measuring device interposed between said bin and said housing, a rotatable valve in said housing having a substance inlet port, a fluid inlet port, and a discharge port, adapted respectively for successive registry with said measuring device, said fluid inlet opening and said fluid discharge opening, a second rotatable valve means in said housing associated with said fluid inlet port and having a passage therethrough for controlling fluid communication between said inlet opening and said fluid inlet port, rotatable means joined to said measuring device, said first valve, and said second valve, and second rotatable means operatively connected to each of said first rotatable means in timed relation for successively introducing a measured substance into said mixing chamber, introducing fluid thereto, and dispensing of the fluid mixture therefrom.

14. A beverage mixing and dispensing device comprising a storage bin, a housing having a mixing chamber adapted for communication therewith and having fluid inlet and discharge openings therein, a measuring drum in communication with said bin, a chute interconnecting said drum and said chamber, a rotatable valve in said chamber having a substance inlet port, a fluid inlet port and a discharge port, adapted respectively for successive registry with said chute, said fluid inlet opening and said fluid discharge opening, and a second valve in said housing associated with said fluid inlet port and having a passage therethrough for controlling fluid communication between said inlet opening and said fluid inlet port.

15. A beverage mixing and dispensing device comprising a storage bin, a housing having a mixing chamber adapted for communication therewith and having fluid inlet and discharge openings therein, a rotatable measuring drum in communication with said bin, a chute interconnecting said drum and said chamber, a rotatable valve in said chamber having a substance inlet port, a fluid inlet port and a discharge port, adapted respectively for successive registry with said chute, said fluid inlet opening and said fluid discharge opening, and a second valve in said housing associated with said fluid inlet port and having a passage therethrough for controlling fluid communication between said inlet opening and said fluid inlet port, manually rotatable means, and a plurality of gear means interconnecting said latter means and said drum, said first valve, and said second valve.

MAX A. JOPPICH.
WALLACE JOURE.

REFERENCES CITED

The following references are of record in the file of this patent:

UNITED STATES PATENTS

| Number | Name | Date |
| --- | --- | --- |
| 1,226,108 | Olney | May 15, 1917 |
| 1,536,854 | Holderle | May 5, 1925 |
| 2,077,850 | Painter | Apr. 20, 1937 |
| 2,252,614 | Bowen | Aug. 12, 1941 |
| 2,402,707 | Stephan | June 25, 1946 |